E. G. PASSMORE.
Lawn Mower.
No. 240,608. Patented April 26, 1881.
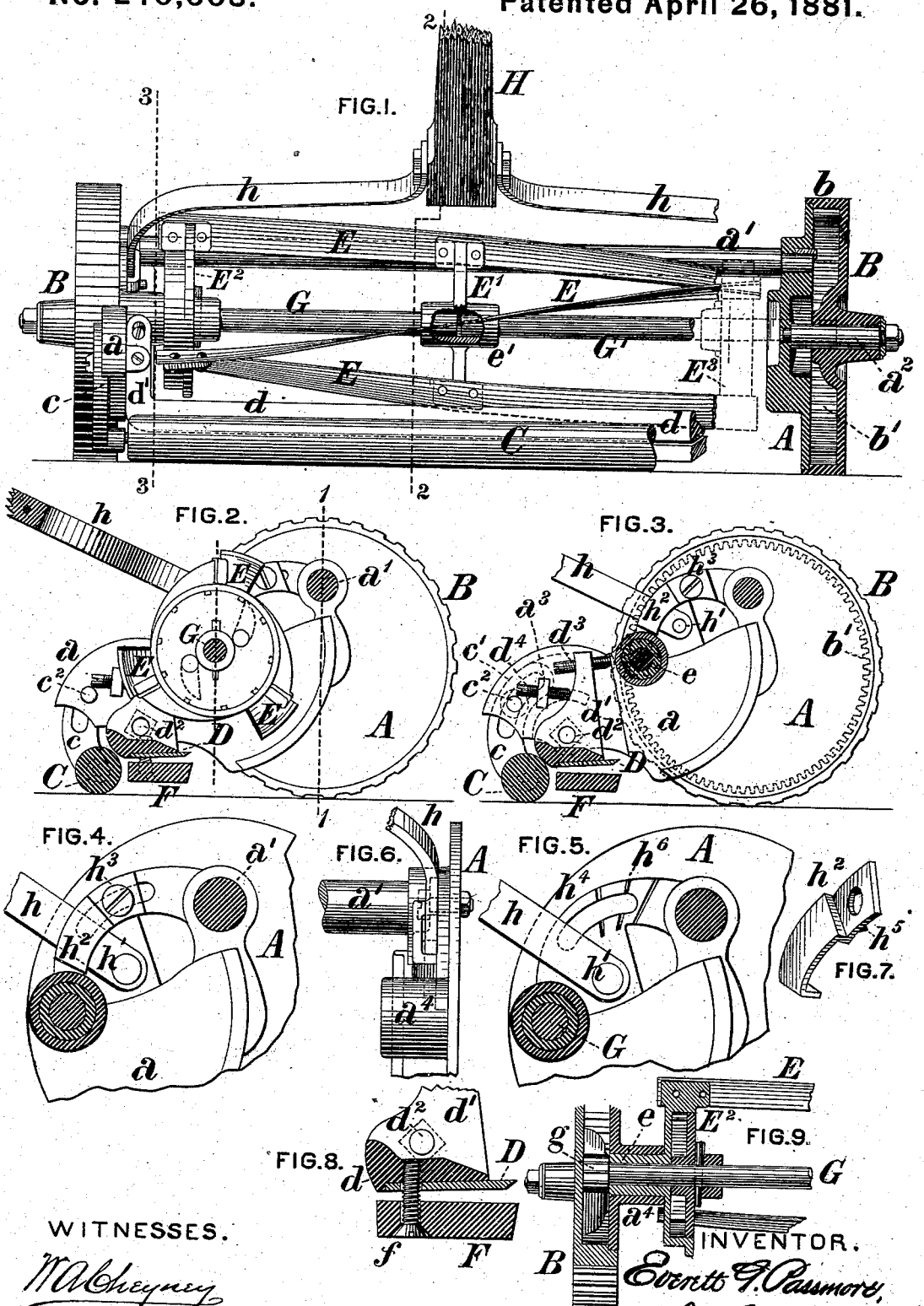
WITNESSES.
INVENTOR.

E. G. PASSMORE.
Lawn Mower.

No. 240,608. Patented April 26, 1881.

2 Sheets—Sheet 2.

WITNESSES.
W A Cheyney
Chas H Cheyney

INVENTOR.
Everett G. Passmore,
by J. Snowden Bell,
Atty.

N. PETERS, PHOTO-LITHOGRAPHER, WASHINGTON, D.C.

UNITED STATES PATENT OFFICE.

EVERETT G. PASSMORE, OF PHILADELPHIA, PENNSYLVANIA.

LAWN-MOWER.

SPECIFICATION forming part of Letters Patent No. 240,608, dated April 26, 1881.

Application filed February 10, 1880.

*To all whom it may concern:*

Be it known that I, EVERETT G. PASSMORE, of the city and county of Philadelphia, in the State of Pennsylvania, have invented certain new and useful Improvements in Lawn-Mowers, of which improvements the following is a specification.

My improvements relate to lawn-mowers in which a cutting apparatus consisting of a rotary spiral cutter and a fixed straight cutter located between and in rear of the axis of two independently-rotating supporting traction-wheels is mounted upon a frame which is pivotal about the axis of said supporting traction-wheels, the rotary cutter being driven by gearing from said wheels, and the machine being supported by said wheels and by a roller in rear thereof, and propelled by a rearwardly-projecting handle or bail. A lawn-mower of this description is set forth and shown in reissued Letters Patent No. 8,560, granted and issued to me under date of January 28, 1879.

The objects of my present invention are to facilitate the operation of the machine in turning curves and insure the immediate stoppage of the rotation of the spiral cutter when the machine is backed, and to prevent the passage of long uncut blades of leaning grass below the edge of the fixed cutter. The improvements claimed are hereinafter fully set forth.

Figure 10:
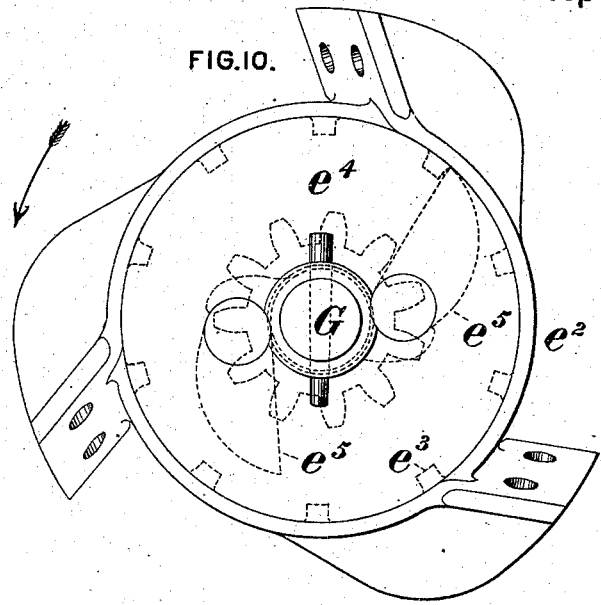
Figure 11:
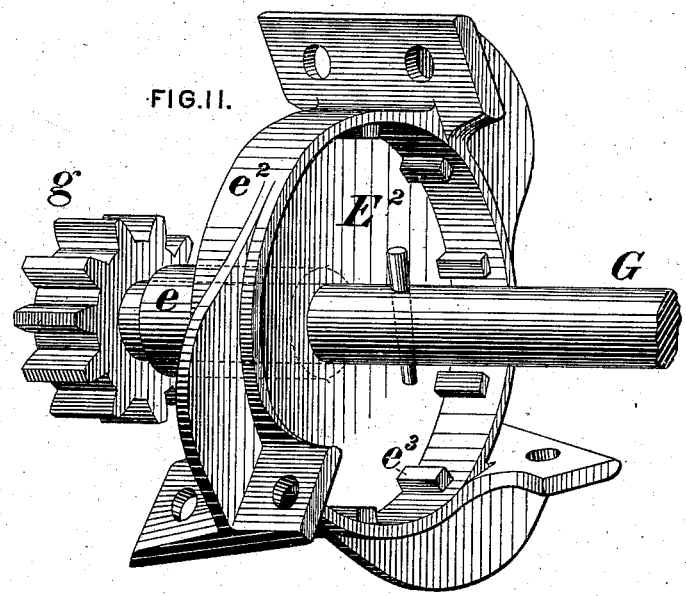
Figure 12:
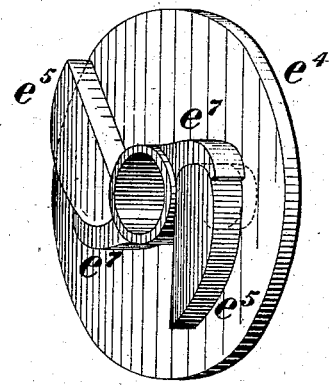
Figure 13:
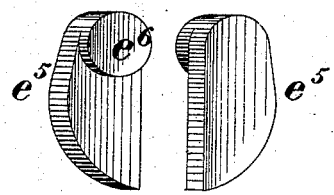

In the accompanying drawings, Figure 1 is a rear view, partly in elevation and partly in section, on the line 1 1 of Fig. 2, of a lawn-mower embodying my improvements; Fig. 2, a vertical section through the machine at the line 2 2 of Fig. 1; Fig. 3, a similar section at the line 3 3 of Fig. 1; Figs. 4 and 5, side views, in elevation and on an enlarged scale, of a portion of one of the frame-disks, showing the attachment of the bail-arm; Fig. 6, a rear view, on a similar scale, of the same; Fig. 7, a view, in perspective on an enlarged scale, of one of the retaining-brackets; Fig. 8, a transverse section, on an enlarged scale, through the fixed cutter, support, and lower strip; Fig. 9, a central section through one of the journals of the rotary cutter; Fig. 10, an end view, in elevation and on an enlarged scale, of one of the ratcheted disks of the rotary cutter, with the accompanying pawl-plate in position; Fig. 11, a view, in perspective, on a similar scale, of the same with the pawl-plate removed; Fig. 12, a similar view of the pawl-plate with the pawls in position, and Fig. 13 a similar view of the pawls detached.

The frame of the machine is composed of two side pieces placed at such distance apart as to admit of the location of cutters of desired length between them. Each frame-piece consists of a circular plate or disk, A, having a downwardly and rearwardly projecting lug, $a$, formed upon or secured to it, and the two frame-pieces are connected by a transverse brace-rod, $a'$. Each of the disks A has a stud, $a^2$, projecting outwardly from its center, upon which stud a supporting traction-wheel, B, is mounted, so as to turn freely. An inwardly-projecting flange, $b$, forming the tread, is cast upon each of the supporting traction-wheels B, and an internal gear, $b'$, is formed upon the inner surface of the flange $b$, which fits snugly over the disk A, the gearing being thus inclosed and protected, while free rotation of the wheel B is permitted. The two side pieces and their connecting brace-rod $a'$ constitute the frame which supports the cutting apparatus, and which is, by reason of its relation, as above described, to the supporting traction-wheels, pivotal about the axis thereof. The rear end of the frame is sustained by a supporting-roller, C, of small diameter relatively to the wheels B B, said roller having end journals mounted in bearings in the lower ends of curved slotted arms $c$, which fit in correspondingly-curved guides $c'$ on the outer sides of the frame-lugs $a$, projecting rearwardly and downwardly below and beyond the peripheries of the wheels B B, and are adjustable and maintained at desired height in the guides by screws $c^2$.

The cutting apparatus consists of a fixed straight cutter, D, extending across the rear of the machine adjacent to the supporting-roller, its front edge defining the line of cut, and a spiral cutter, E, rotating above and in front of the straight cutter. The fixed cutter D is a straight steel bar, sharpened to a chisel-edge at its front and secured upon the lower side of a transverse support, $d$, having vertical arms $d'$ upon its ends. The arms $d'$ fit against the inner sides of the frame-lugs $a$, and each arm is connected to the adjacent lug by a stud-bolt, $d^2$, the stud-bolts of the two arms being located in the same axial line. The fixed cutter and its support are thus made pivotal upon the frame, and the distance of the cutting-edge of the fixed cutter from the axis of the rotary cutter may be varied and adjusted as required by screws $d^3$ $d^4$ at each end of the support $d$, the screws $d^3$ engaging nuts in the upper ends of the arms $d'$ and bearing against projections on the frame-lugs $a$, and the screws $d^4$, which are located in rear of and below the screws $d^3$, engaging nuts $a^3$, cast upon the frame-lugs and bearing against the rear ends of the arms $d'$. It will be obvious that by slackening the screws $d^4$ and tightening the screws $d^3$ the support $d$ can be turned upon the stud-bolts $d^2$ as pivots, so as to elevate and bring the front edge of the fixed cutter D closer to the rotary cutter E. A reversal of the operation will, of course, depress the fixed cutter and increase its distance from the rotary cutter, and, as in each case the two screws tend to lock or bind each other, there is no liability for the parts to work loose and thereby change the position of the fixed cutter after adjustment.

A strip of wood, F, extends the entire length of the fixed cutter D, and is secured to the lower side thereof by screws $f$, so as to be adjustable toward or from the same or to be readily removed, when desired, to admit of the substitution of a strip of different thickness. The front of the strip F is in line, or thereabout, with the edge of the fixed cutter, and it is of such thickness as to nearly, but not quite, touch the ground as the machine is pushed forward, its object being to force upward such blades of grass as lean toward the machine, so as to cause them to come in contact with the fixed cutter and to be severed between the same and the rotary cutter. The function of the strip F is important in promoting perfect work, as the supporting traction-wheels B press down the standing grass over which they run, and, under ordinary circumstances, unless the cut is very close, the grass so pressed down will frequently on the return swath pass under the fixed blade, thus leaving strips the width of the wheels not properly cut.

The rotary cutter E is, in this instance, composed of three spiral blades of metal, which are secured at their centers and ends to flanges cast upon disks E' $E^2$ $E^3$, mounted loosely upon two horizontal shafts, G G', located adjacent to each other and in the same axial line. Each of the end disks, $E^2$ $E^3$, has a central hollow journal, $e$, cast upon its outer side, the journals $e\,e$ turning in bearings $a^4$ upon the frame-lugs $a$, and constituting the outer bearings for the shafts G G', the adjoining inner ends of which turn in a hollow hub or sleeve, $e'$, cast upon the central disk, E'. The shafts G G' have pinions $g$ secured upon their outer ends, said pinions meshing with the internal gears, $b'$, of the supporting traction-wheels B, and imparting rotation therefrom to the shafts G G' independently during the movement of the machine. A cylindrical rim or flange, $e^2$, Fig. 11, having a series of ratchet-teeth or projections, $e^3$, upon its inner surface, is cast upon the inner side of each of the end disks, $E^2$ $E^3$, and circular pawl-plates $e^4$, each fitting easily within one of the rims, $e^2$, are secured upon the shafts G and G'. Gravitating pawls $e^5$ are pivoted loosely in and rotate with the plates $e^4$ in such manner as that when either of the shafts G G' is rotated in the direction of the forward movement of the machine, as indicated by the arrow, Fig. 10, the pawls will engage the projections $e^3$ and rotate the attached disk and rotary cutter, and when the shaft is rotated in the reverse direction the pawls will slide freely over the projections and no rotation will be imparted to the cutter. The front or working face of each pawl is straight, and the opposite face is curved from its point to the journal $e^6$, on which it is suspended in the plate $e^4$, so that when thrown outward by the action of gravity during the backward movement of the shaft it slips readily, and without tendency to jam, over the projections of the rim. Shoulders $e^7$ upon the plate $e^4$ serve to provide additional abutments for the pawls when rotating the cutter.

The bail or handle H, by which the machine is propelled, projects backward from the frame, to which it is connected in advance of the fixed cutter and in rear of the axial line of the supporting traction-wheels by arms $h$, each of which is pivoted upon a stud, $h'$, projecting from the inner side of one of the frame-disks A. The angle of the bail relatively to the fixed cutter may be varied and adjusted as required by retaining-brackets $h^2$, each of which has an offset fitting over the lower end of one of the arms $h$, which passes between said offset and the disk, the bracket being secured in position against the disk by a screw, $h^3$, fitting a curved guide, $h^4$, in the disk A, a tongue, $h^5$, on the back of the bracket $h^2$ entering one of a series of transverse slots, $h^6$, formed in the sides of the guide $h^4$. The offsets of the retaining-brackets are of such length as to admit of a limited range of movement of the bail-arms $h$, and when the brackets are secured in position they serve further to prevent the arms from slipping off the studs $h'$, so that a secure connection of the bail to the frame is provided, as well as a simple and convenient method of adjustment and attachment. The position of the studs $h'$ relatively to the axis of the supporting traction-wheels is such that the power applied to the bail acts both to propel the machine forward and to exert a downward pressure upon the rear of the frame, so as to prevent the gearing from lifting the cutting apparatus, while leaving the latter free to follow the inequalities of the ground.

I claim as my invention and desire to secure by Letters Patent—

1. The combination, in a lawn-mower, of a rotary spiral cutter having hollow end journals, and a driving-shaft passing freely through said journals and imparting motion to the rotary spiral cutter by a ratchet device mounted upon the shaft between the ends of the rotary spiral cutter, substantially as set forth.

2. The combination, substantially as set forth, of a disk supported by and turning upon a hollow journal cast upon one of its sides and having a ratcheted rim upon its opposite side, a shaft passing freely through said journal, a plate secured upon said shaft and fitting freely within the rim of the disk, and pawls pivoted to said plate.

3. The combination, in a lawn-mower, of a rotary spiral cutter, a fixed straight cutter, a roller supporting said fixed cutter, and the clearing-strip F, carried by the fixed cutter, substantially as and for the purpose described.

4. A two-part shaft with pinions on the ends, in combination with the tubular journals of the rotary cutter and pawls that connect the said shaft and cutter.

EVERETT G. PASSMORE.

Witnesses:
J. SNOWDEN BELL,
W. K. SHUYNK.